United States Patent
Baldwin

(10) Patent No.: US 9,307,148 B1
(45) Date of Patent: Apr. 5, 2016

(54) VIDEO ENHANCEMENT TECHNIQUES

(71) Applicant: Amazon Technologies, Inc., Reno, NV (US)

(72) Inventor: Leo Benedict Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 245 days.

(21) Appl. No.: 13/894,949

(22) Filed: May 15, 2013

(51) Int. Cl.
*H04N 5/228* (2006.01)
*H04N 5/232* (2006.01)

(52) U.S. Cl.
CPC ................................. *H04N 5/23267* (2013.01)

(58) Field of Classification Search
CPC .............. H04N 5/232; H04N 5/23251; H04N 5/23261; H04N 5/144; H04N 19/137; H04N 19/124; H04N 9/8042; H04N 9/8205
USPC ............... 348/154, 155, 208.1–208.4, 208.13
See application file for complete search history.

(56) References Cited

U.S. PATENT DOCUMENTS

| | | | |
|---|---|---|---|
| 5,801,773 A | 9/1998 | Ikeda | |
| 7,612,804 B1 | 11/2009 | Marcu et al. | |
| 7,692,700 B2 | 4/2010 | Johannesson et al. | |
| 8,385,687 B1 | 2/2013 | Blais-Morin | |
| 9,007,490 B1 | 4/2015 | Yuan et al. | |
| 2002/0113882 A1 | 8/2002 | Pollard et al. | |
| 2008/0094490 A1 | 4/2008 | Compton et al. | |
| 2008/0165266 A1 | 7/2008 | Jenkins | |
| 2008/0267530 A1 | 10/2008 | Lim | |
| 2010/0328481 A1 | 12/2010 | Shimizu et al. | |
| 2011/0222793 A1 | 9/2011 | Ueda et al. | |
| 2011/0298942 A1* | 12/2011 | Uchida et al. | 348/222.1 |
| 2012/0026290 A1 | 2/2012 | Lim et al. | |
| 2012/0162454 A1* | 6/2012 | Park | H04N 5/145 348/208.6 |
| 2013/0083204 A1 | 4/2013 | Solhusvik et al. | |
| 2013/0121569 A1 | 5/2013 | Yadav | |

(Continued)

OTHER PUBLICATIONS

Kamenicky, Jan et al., "Superfast Superresolution", "Superfast Superresolution," 18th IEEE International Conference on Image Processing, 2011, Šroubek Filip, Kamenický Jan, Peyman Milanfar, 2011, 4 pages.

(Continued)

*Primary Examiner* — Yogesh Aggarwal
(74) *Attorney, Agent, or Firm* — Novak Druce Connolly Bove + Quigg LLP

(57) ABSTRACT

Systems and approaches are provided for automating editing of videos to reduce or remove jitter or camera-shake and to smooth abrupt or jerky transitions caused by pan, zoom, tilt, and other intentional movement of an electronic device used to capture the video. A video can be divided into zones, and inter-frame motion can be estimated for each zone of each frame of the video. A gross motion vector can be determined for each frame based on the motion vectors determined for each zone, with outlying motion vectors for one or more zones discarded so as not to bias the gross motion vector for a frame. The gross motion vectors in aggregate, which describe the global motion or camera motion of the video, can be filtered to remove unintended motion, such as low magnitude and high frequency motion due to camera-shake. Various embodiments also provide for image enhancement of videos such as deblurring; removal of noise, specular reflection, and other image distortions; histogram optimization; brightness and contrast optimization; and color-cast correction.

20 Claims, 8 Drawing Sheets

(56) References Cited

U.S. PATENT DOCUMENTS

2013/0307922 A1   11/2013   Chou et al.
2014/0125825 A1   5/2014   Baer et al.

OTHER PUBLICATIONS

Park, Sung C. et al., "Super-Resolution Image Reconstruction: A Technical Overview", "Super-Resolution Image Reconstruction: A Technical Overview," IEEE Signal Processing Magazine, May 2003, Park, Sung Cheol; Park, Min Kyu, 2003, 16 pages.

Tsai, Roger Y., "A Versatile Camera Calibration Technique for High-Accuracy 3D Machine Vision Metrology Using Off-the-Shelf TV Cameras and Lenses", "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, Tsai, Roger Y., 1987, 22 pages.

Yang, Qingxiong et al., "Real-time Specular Highlight Removal Using Bilateral Filtering", http://vision.ai.uiuc.edu/~qyang6/, 2010, 14 pages.

Zhengyou, Zhang, "A Flexible New Technique for Camera Calibration", "A Flexible New Technique for Camera Calibration," IEEE Transactions on Pattern Analysis and Machine Intelligence, Zhengyou Zhang, 22(11): 1330-1334, 2000, 2000, 22 pages.

\* cited by examiner

VIDEO ENHANCEMENT TECHNIQUES

BACKGROUND

Video capture is becoming an increasingly common feature for many personal computing devices, such as laptop computers, tablets, smartphones, and head-mounted displays (e.g., eyeglasses, visors, helmets). Users of such personal computing devices find it convenient to be able to casually record videos of personal experiences as they arise. While the accessibility and portability of personal computing devices can offer users additional flexibility and convenience, such devices may not necessarily be conducive for optimizing video capture. For example, portable computing devices with video recording capability often lack optical image stabilization such that videos captured using such devices can be highly susceptible to jitter or camera-shake. Users intending to shoot videos with personal computing devices also may not have readily available access to tripods, dollies, damped cranes, and other video stabilization equipment. Further, the size and other characteristics of the lens(es) and image sensor(s) incorporated by portable computing devices may affect the quality of recorded videos.

BRIEF DESCRIPTION OF THE DRAWINGS

Various embodiments in accordance with the present disclosure will be described with reference to the drawings, in which.

DETAILED DESCRIPTION

Figure 1A:
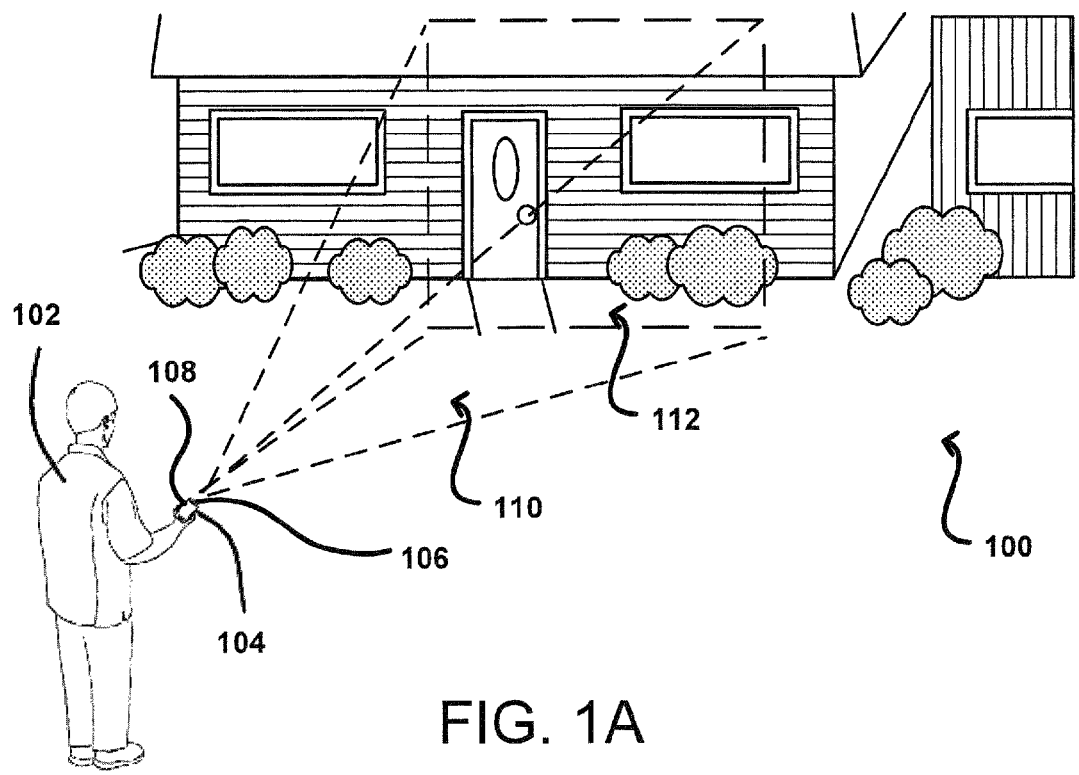
FIGS. 1A and 1B illustrate an example situation of a user employing a computing device for capturing a video and an example frame of the captured video.

Systems and methods in accordance with various embodiments of the present disclosure may overcome one or more of the aforementioned and other deficiencies experienced in conventional approaches for creating and editing videos. In particular, various embodiments involve post-processing of a video captured using an electronic device to remove jitter or camera-shake (i.e., unintentional camera motion) and to smooth segments corresponding to deliberate camera motion (e.g., pan, tilt, zoom). In at least some embodiments, an input video can also be automatically edited frame-by-frame for reduction or removal of blur, specular reflection, and other blemishes and/or for histogram optimization, brightness and contrast optimization, color-cast correction, edge enhancement, and other image enhancements.

In various embodiments, raw input video can be captured in a video format or resolution larger than a standard video format or resolution. The input video may be analyzed to estimate camera motion. In some embodiments, the estimated motion vectors can be "gross" or averaged for a whole frame. In other embodiments, a frame can be divided into "zones" and a motion vector can be determined for each "zone." Motion vectors determined to be outliers due to displacement of an object moving within a zone, such as a running dog or a flag blowing in the wind, can be discarded so as not to bias the gross motion vector for the frame. After one or more motion vectors have been determined for each frame (e.g., one gross motion vector per frame or a motion vector corresponding to each zone of each frame), the global motion of the input video can be analyzed for magnitude and frequency. Small magnitude motion (e.g., 0-3 degrees) and high frequency motion (e.g., 4-40 Hz) can be characterized as jitter or camera-shake and due to unintentional camera motion, and higher magnitude motion and/or lower frequency motion can be characterized as intentional camera motion. Motion due to jitter or camera-shake can be reduced or removed by selecting pixels of each frame of the input video to correct for undesired motion and to generate a stabilized and damped output video of a standard video format or resolution.

In some embodiments, the global motion of an input video determined to be deliberate camera motion (e.g., pan, tilt, zoom by a user) can be smoothed if transitions between frames appear to be abrupt or inconsistent with respect to a perceived camera path. In at least some embodiments, blur in a frame due to camera motion can be reduced by applying one or more deconvolutions or other deblurring techniques according to the estimated motion vector(s) for that frame. Further, image enhancement techniques, such as histogram optimization, brightness and contrast optimization, color-cast correction, reduction or removal of noise (e.g., dark-current shot noise, photon shot noise, fixed pattern noise, bias noise, and quantization noise), reduction or removal of specular reflection, etc., can also be applied on a frame-by-frame basis.

Various other functions and advantages are described and suggested below in accordance with the various embodiments.

FIG. 1A illustrates an example situation 100 of a user 102 operating a computing device 104 for shooting video of a scene 112 in front of the user. Although a portable computing device (e.g., a smart phone, tablet, or portable media player) is shown that can be held in a user's hand, it should be understood that other types of computing devices can utilize aspects of the various embodiments as should be apparent in light of the teachings and suggestions contained herein. The computing device 104 in this example includes a camera 106 positioned at the back of the device such that a person, object, or scene within the field of view of the camera 110 can be recorded by the camera. In this example, camera 106 comprises a digital camera incorporating a CMOS image sensor. In other embodiments, a camera of a device can incorporate other types of image sensors (such as a charged couple device (CCD)) and/or can include multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, infra-red (IR) sensors, and other optical, light, imaging, or photon sensors.

The example device 104 also includes a display screen 108 at the front of the device, on an opposite surface from the camera 106. It should be understood that, while the components of the example device are shown to be on a "front" and "back" of the device, there can be similar or alternative components on the "top" or "side" of the device as well (or instead). Further, directions such as "front," "back," "top," and "side" are used for purposes of explanation and are not intended to require specific orientations unless otherwise stated. The display screen 108 is a touchscreen comprising a plurality of capacitive touch sensors and capable of detecting the user's fingertip touching points of the screen as input for the device. In other embodiments, the display element may implement a different touch technology (e.g. resistive, optical, ultrasonic) or may not be capable of detecting a user's touch.

Figure 1B:
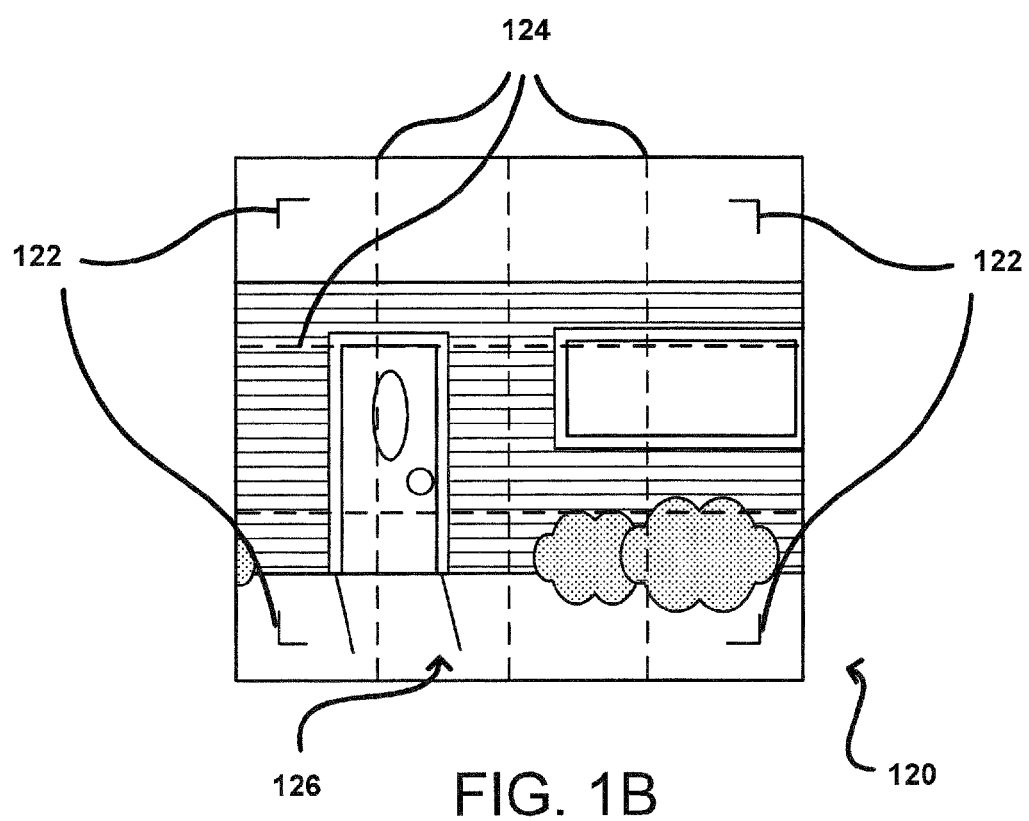

FIG. 1B illustrates an example of a single frame 120 of a video captured by the user. In this example, the video is captured in raw format at a resolution larger than a standard resolution for the desired output video. For example, the desired format for the output video may be "720p," which specifies a frame size in pixels of 1280×720. The input video may then be recorded at a larger frame size, such as 1400×800. As another example, the desired format for the output video may be "1080p," which specifies a frame size in pixels of 1920×1080. The frame size in pixels of the input video for this desired output video format may then be 2280×1280. Other standard output video formats include "2000p" (2048×1536), "2160p" (3840×2160), "2540p" (4520×2540), "4000p" (4096×3072), "4320p" (7680×4320), as well as other formats. The respective frame sizes for the input videos for each of these formats could be 2280×1710, 5040×2835, 4560×3420, or 8530×4800. In other embodiments, video may be captured at a standard video format (e.g., 1280×720, 1920×1080) and upsampled to obtain a larger resolution video, and the upsampled video may be trimmed to generate an output video of a format corresponding to the original resolution of the video. In this example, guide marks 122 are presented to indicate that a frame of the output video may include only the pixels within the guide marks while a frame of the input video could include all of the pixels of the frame 120.

FIG. 1B also illustrates that the video frame 120 has been divided into 4×3 "zones," including an example "zone" 126. Although the video frame 120 is divided into 4×3 zones in this example, it will be appreciated that other embodiments may divide video frames according to numerous other partitions. For example, a "talking head" video could be divided according to a "blob" or region in the foreground corresponding to the "talking head" and a background comprising a remaining portion of the video frame. Further, zones can include overlapping partitions of video or an input video may not be divided in some embodiments. However, it may be preferable to divide an input video into zones because of some of the advantages of such an approach, including the capability of determining motion for each zone using parallel or distributive computing techniques and more robust estimation of global motion by being able to distinguish camera motion from objects moving in the frame.

Figure 2A:
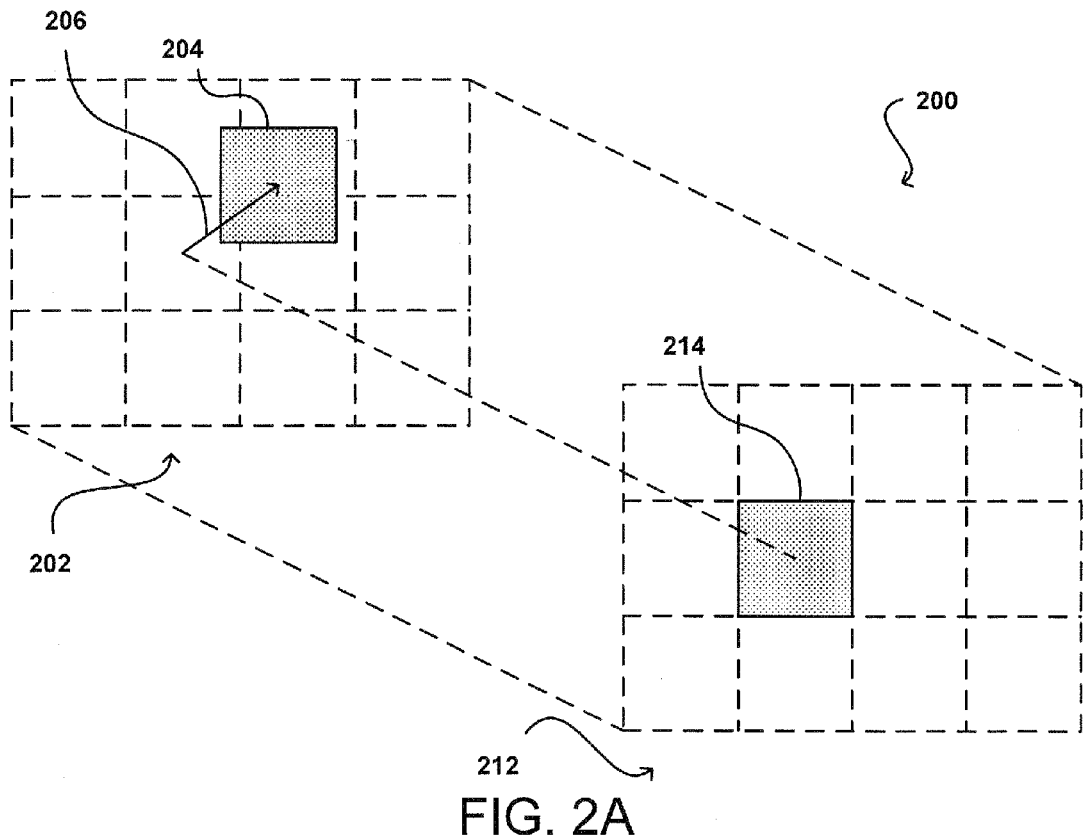
FIGS. 2A, 2B, 2C, and 2D illustrate example approaches for estimating motion of a video in accordance with various embodiments.

Various approaches can be used to determine motion between each frame of an input video, including block matching, differentiation, and phase correlation. Block matching is a correlation technique that searches for the best match between an image block of a current frame and a specified area of a previous frame. FIG. 2A illustrates an example 200 of a block matching method in accordance with an embodiment. In this example, a previous video frame 202 (or a portion of the previous video frame, i.e., zone) captured at time t−1 and a current video frame 212 (or a portion of the corresponding zone in the current video frame, i.e., corresponding zone) captured at time t have been partitioned into non-overlapping rectangular blocks, such as example block 214. A block, such as block 214, in frame (or zone) 212 is used to search for a best matching block in frame (or zone) 202. In this example, candidate matching block 204 is determined to be the best matching block to block 214, and the motion between frames (or zones) 202 and 212 is determined from the displacement or motion vector 206. The size of blocks can affect the performance of motion estimation. Smaller blocks can better approximate natural object boundaries and actual motion but may require more data storage and processing. Blocks are typically 8×8 or 16×16 but it will be appreciated by one of ordinary skill that other size blocks or variable size blocks can be used in other embodiments.

The metric used to determine the best matching block in a previous frame can be based upon maximizing the normalized cross-correlation function (NCF) or minimizing a criterion, such as the mean squared error (MSE), mean absolute difference (MAD), or the number of threshold differences (NTD). For example, if (u, v) represents a motion vector candidate of an image block of size M×N, and f(m, n, t) is the image intensity at the frame coordinate (m, n) of the tth frame, then these functions can be defined as follows:

$$NCF(u, v) = \frac{\Sigma\Sigma f(m, n, t)f(m-u, n-v, t-1)}{[\Sigma\Sigma f^2(m, n, t)]^{1/2}[\Sigma\Sigma f^2(m-u, n-v, t-1)]^{1/2}}$$

$$MSE(u, v) = \frac{1}{MN}\sum_{m=0}^{M-1}\sum_{n=0}^{N-1}[f(m, n, t) - f(m-u, n-v, t-1)]^2$$

$$MAD(u, v) = \frac{1}{MN}\sum_{m=0}^{M-1}\sum_{n=0}^{N-1}|f(m, n, t) - f(m-u, n-v, t-1)|$$

$$NTD(u, v) = \frac{1}{MN}\sum_{m=0}^{M-1}\sum_{n=0}^{N-1}g(f(m, n, t), f(m-u, n-v, t-1)),$$

where, $$g(\alpha, \beta) = \begin{cases} 1 & \text{if } |\alpha - \beta| > T_0 \\ 0 & \text{if } |\alpha - \beta| \leq T_0 \end{cases}$$

is the counting function with threshold $T_0$.

Figure 2B:
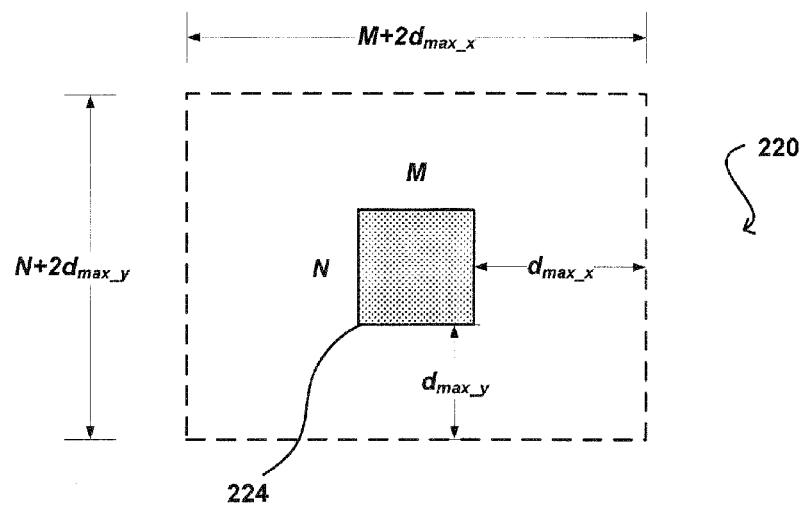

Various approaches can be used to search for the best matching block in a previous frame of an input video to a block of a current frame of the input video. In one embodiment, an exhaustive search is used to examine every candidate block inside a search region. FIG. 2B illustrates an example of a search region 220 that can be used for locating the best matching block in a previous frame of an input video to a block of a current frame of the input video. The search space may be limited to a particular sized window of the frame and/or a maximum horizontal displacement $d_{max\_x}$ and vertical displacement $d_{max\_y}$. For example, if the size of a block 224 of a current frame is M×N, then the size of the search region is $(M+2d_{max\_x})(N+2d_{max\_y})$, and the number of candidate blocks to search in the previous frame is $(2d_{max\_x}+1)(2d_{max\_y}+1)$ using a full or exhaustive search approach.

While a full or exhaustive search is guaranteed to provide the best matching candidate block, such an approach can be resource intensive and may be less preferable if video editing is performed on-device rather than via a remote distributed computing server system. Thus, in other embodiments, fast searching algorithms can be used to reduce the amount of computational complexity, data input, and output bandwidth compared to the full or exhaustive search. A fast searching algorithm typically starts with analysis of an initial set of candidate blocks scattered across the search region. The distance between two nearby candidate blocks, referred to as the step size, may change based on the results of analyzing the initial set of candidate blocks. For example, after the initial analysis is completed, a typical fast search strategy proceeds by moving to the most promising candidate block and conducting another set of searches using a smaller step size. This process is repeated until there are no additional steps that can be taken and an approximate best matching block is determined from the candidate blocks analyzed. Fast-search block matching strategies include the three step search, 2D logarithmic search, and conjugate direction search, and improvements to reduce computation such as subsampling, hierarchical block matching, overlapped block matching, and other variations.

Figure 2C:
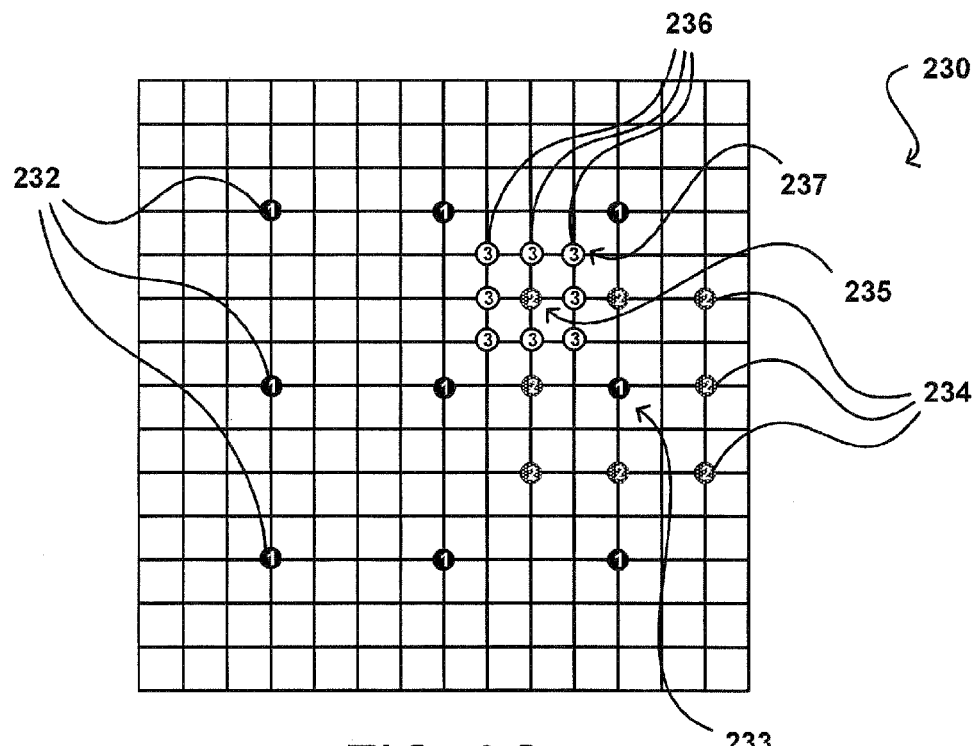

FIG. 2C illustrates an example of the three step search of a frame (or zone) 230. The step size of the three step search is initially half or slightly greater than half of the search region. In the first step, nine candidate blocks 232 are evaluated, including the central point of the search region and eight candidate blocks a horizontal or vertical distance of the initial step size from the center of the search region. In the second step, the search area center is moved to the best matching candidate block determined from the previous step. In this example, the candidate block 233 has been determined to be the best matching candidate block (e.g., maximum of NCF or minimum of MSE, MAD, or NTD). The step size is reduced by half, and the eight candidate blocks 234 a horizontal or vertical distance of the new step size from the candidate block 233 and the candidate block 233 are compared according to the matching criterion. In the third and final step of the three step search, the search area is again moved to the best matching candidate block, here candidate block 235. The step size is reduced again by half, and the eight candidate blocks 236 and candidate block 235 are evaluated based on the matching criterion. In this example, candidate block 237 is determined to be the best candidate matching block and displacement for the frame (or zone) 230 is measured from this block.

Figure 2D:
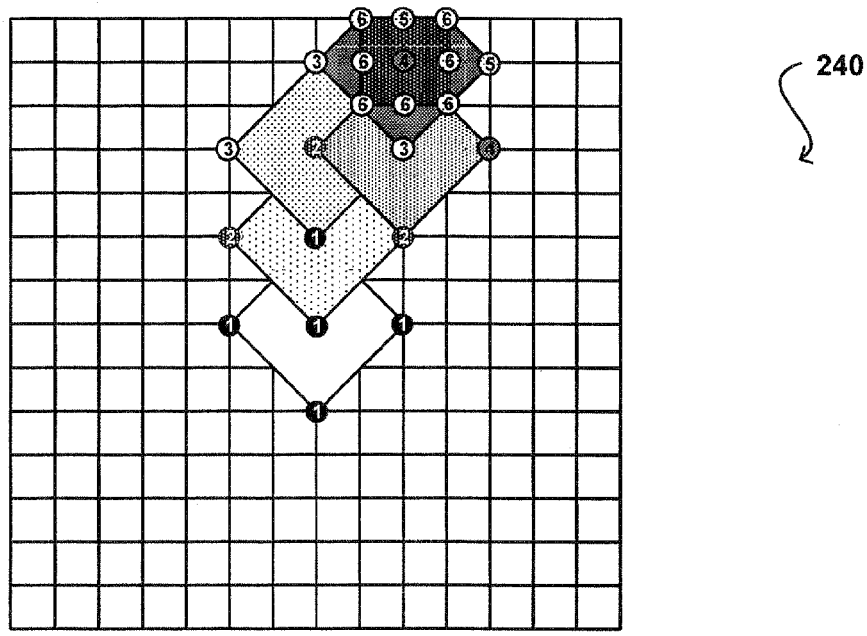

Another fast block matching search strategy is the 2D logarithmic search, also sometimes referred to as the diamond search or the small diamond search. FIG. 2D illustrates an example of the 2D logarithmic search of a frame (or zone) 240. The 2D logarithmic search also begins at the center of the search region and each step consists of analyzing five candidate blocks, a candidate block at the center of a diamond-shaped search area and the four candidate blocks a distance of a step size away from the center of the search area. The initial step size is $\max(2, 2^{m-1})$ where $m=\mathrm{floor}(\log_2 d_{max})$. In each step, the best matching candidate block and four candidate blocks around the best matching candidate block are selected for further evaluation. The step size remains the same, as seen in steps 1 through 5 unless the best matching candidate block is the current central candidate, then the step size is halved, as seen in step 6. When the step size is reduced to 1, as shown from step 5 to step 6, nine search points in a 3×3 area surrounding the last best matching candidate block is analyzed to determine the best matching candidate block. Displacement between the block of the current frame (or zone) and the best matching candidate block is estimated to be the motion vector between the current frame (or zone) and the previous frame (or zone).

As mentioned, other approaches to fast block matching search are the conjugate direction search and variations such as subsampling, hierarchical block matching, and overlapping block matching. In the conjugate direction search, all candidate blocks along one row or column of the search region is analyzed. The best matching candidate block is selected from this initial analysis, and the search continues along the other axis. A subsampling strategy uses only a portion of the pixels inside an image block to calculate the matching criterion or a portion of the blocks from a current frame (or zone), such as alternating blocks in the frame (or zone). In hierarchical block matching, a Gaussian or Laplacian pyramid or other hierarchical structure composed of a set of images at different resolutions is generated, where the lowest level is the image of the original block at the highest resolution, and each subsequent level of the pyramid or hierarchical structure is obtained by low-pass filtering and subsampling the lower level. The search algorithm finds initial motion vector estimations starting from the top of the pyramid or hierarchical structure and refines the search by descending the pyramid or hierarchical structure. A large block size can be selected at the beginning of the search to obtain a rough estimate of the motion vector, and the search can be refined by decreasing the block size and search region. The overlapping block match strategy comprises loosening the non-overlapping block partitions, applying a block matching strategy to determine the best matching candidate block, and then applying a windowing function to determine a windowed MAD (or other criterion, e.g., MSE, NTD) to achieve sub-pixel accuracy, typically half-pixel or quarter-pixel accuracy.

In some embodiments, differential methods can be used to determine motion of an input video. Differential techniques compute motion from spatial and temporal derivatives of image features such as intensities or filtered versions of the image. Such techniques are based on the assumption that all temporal intensity changes are due to motion only. This can be represented by:

$$I(x,y,t)=I(x+\delta x, y+\delta y, t+\delta t),$$

where $I(x, y, t)$ is a center pixel in a n×n neighborhood of pixels and moves by $\delta x$, $\delta y$ in time $\delta t$. For small displacements, a linearized Taylor series expansion yields the motion constraint equation:

$$\nabla I \cdot \vec{v} = -I_t,$$

where $\nabla I=(I_x, I_y)$ is the spatial intensity gradient and $\vec{v}=(v_x, v_y)$ is the image velocity or optical flow at pixel $(x, y)$ at time t. The motion constraint equation is an ill-posed problem in that it yields one equation and two unknowns. This is a mathematical consequence of the aperture problem, wherein there may be insufficient local image intensity structure to measure full image velocity. A typical way to overcome the ill-posedness problems of differential methods is to use smoothing techniques and smoothness assumptions prior to differentiation to remove noise and to stabilize the differentiation process. Local differential methods use spatial constancy assumptions while global differential techniques supplement the motion constraint with a regularizing smoothness term.

In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." *In Proceedings of the 7th international joint conference on Artificial intelligence.* 1981, and is incorporated herein by reference. The Lucas-Kanade algorithm estimates displacement of a neighborhood of pixels by analyzing changes in pixel intensity from the known intensity gradients of the image in that neighborhood. As mentioned, for a simple pixel, there are two unknowns and one equation, such that the system is ill-posed or under-determined. Therefore, a neighborhood of pixels is used to derive additional equations to make the system over-determined. The system can then be solved using a least squares solution that averages the motion vectors over the neighborhood. The Lucas-Kanade method attempts to minimize:

$$\sum_{x,y \in \Omega} W^2(x,y) [\nabla I(x,y,t) \cdot \vec{v} + I_t(x,y,t)]^2,$$

where W(x,y) is a windowing function that gives more influence to constraints at the center of the neighborhood than those at the periphery. The result of the Lucas-Kanade algorithm is a set of motion vectors distributed over the image estimating movement of objects in the scene.

In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." *Artificial intelligence* 17, no. 1 (1981): 185-203, which is incorporated herein by reference. Horn-Schunk uses a global regularization calculation as an additional constraint. Horn-Schunk assumes that images consist of objects that undergo rigid motion such that motion will be smooth over relatively large areas of the image. The Horn-Schunk algorithm attempts to minimize:

$$\int_D (\nabla I \cdot \vec{v} + I_t)^2 + \lambda^2 \left[ \left( \frac{\partial v_x}{\partial x} \right)^2 + \left( \frac{\partial v_x}{\partial y} \right)^2 + \left( \frac{\partial v_y}{\partial x} \right)^2 + \left( \frac{\partial v_y}{\partial y} \right)^2 \right] dx\,dy$$

defined over the image domain D, where the magnitude of λ corresponds to the influence of the smoothness term.

In some embodiments, phase correlation is used to determine inter-frame motion of an input video. Some advantages of phrase correlation over other approaches for determining inter-frame motion include the ability to measure large displacements at a sub-pixel level of accuracy, no requirement of a search region or search strategy, invariance to global illumination changes and moving shadows, and insensitivity to noise. Phase correlation is a frequency domain technique based on the shift property of the Fourier transform for measuring motion. According to this principle, a shift in the spatial domain is equivalent to a phase shift in the frequency domain. To determine inter-frame motion using phase correlation, the cross power spectrum (CPS) of two frames is determined. If one frame is a shifted replica of the other, i.e., $f_2(x,y)=f_1(x+x_0, y+y_0)$ then the phase of the cross power spectrum of the two frames $f_1$ and $f_2$ can be defined as:

$$CPS(f_1, f_2) = \frac{F_1(\xi,\eta) \cdot F_2^*(\xi,\eta)}{|F_1(\xi,\eta) \cdot F_2^*(\xi,\eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at $(x_0, y_0)$, the required shift.

Figure 3A:
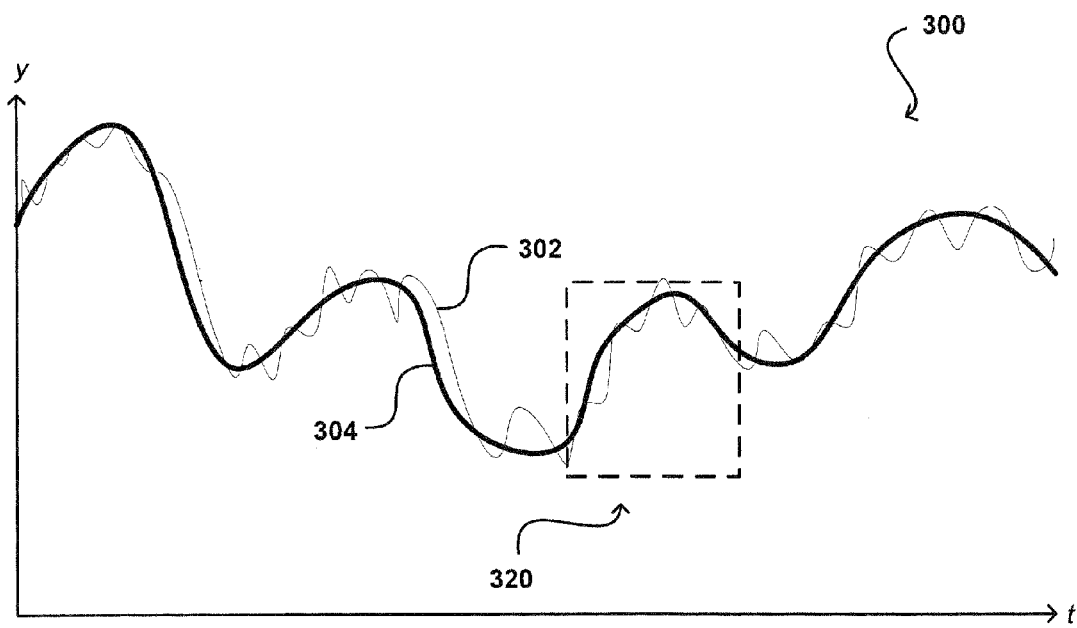
FIGS. 3A and 3B illustrate example approaches for compensating for undesired motion of a video in accordance with an embodiment.

FIG. 3A illustrates the vertical component of the raw global or camera motion of an input video 302 and the vertical component of a modified, stabilized camera motion 304. In this example, the raw camera motion 302 has been obtained by combining the inter-frame motion vectors determined for each frame of the input video using one of the motion estimation techniques discussed herein, such as block matching, differentiation, or phase correlation. As seen in FIG. 3A, motion 302 includes a low magnitude, high frequency (e.g., 0 to 3 degrees magnitude, 4 to 40 Hz frequency) component that is assumed to be due to unintentional, undesired camera-shake. This unintended motion can be filtered to generate an output video that reduces or removes the undesired motion, such as the modified motion 304. This can be accomplished by shifting each frame by an appropriate amount, which may be referred to as a correction vector, so that the frames make up a stabilized output video. Various approaches can be used to filter the unintended motion, such as motion vector integration, frame position smoothing, or Kalman filtering.

Motion vector integration yields correction vectors by integration of the differential global motion vectors of each input frame. The correction vector $v_c$ for a frame n can be defined as:

$$v_c(n) = k \times v_c(n-1) + v_{act}(n),$$

where $v_{act}$ is the inter-frame differential motion vector obtained in motion estimation and k is a damping factor. The damping factor k is typically chosen as a fixed value between 0 and 1 depending on the degree of stabilization desired. A high damping factor can result in the motion vectors being damped strongly, which may result in a high degree of stabilization. However, a high damping factor can also remove some of the intentional camera motion. For lower damping factors, more of the intentional camera motion is preserved but some of the jitter or camera-shake can also remain.

Frame position smoothing obtains correction vectors by low-pass filtering absolute frame positions, which are obtained by the accumulation of differential motion vectors during motion estimation. The global or camera motion can be thought of as being accumulated to yield an absolute frame position with respect to a frame number signal, $x_{act}(n)$. This signal is low-pass filtered (e.g., Gaussian, Butterworth) to remove high-frequency components corresponding to jitter or camera-shake, and retain low-frequency components corresponding to intentional camera motion. The absolute position each frame should be brought into with respect to the first frame to have the output video display only intended camera motion is the low-pass filtered absolute frame position, $x_{lpf}(n)$. For frame position smoothed stabilization, the correction vector $v_c$ for frame n can then be defined as:

$$v_c(n) = x_{lpf}(n) - x_{act}(n).$$

Kalman filtering provides an estimate of a state of a discrete-time process that can be defined as a linear system:

$$x(t+1) = F \times x(t) + w(t),$$

where w(t) represents process noise. The Kalman filter operates using observations of all or some of the state variables, defined by the observation system:

$$y(t) = H \times x(t) + v(t),$$

where v(t) represents measurement noise. Process and measurement noise are assumed to be independent of each other, and can be modeled as white noise having respective normal probability distributions of w~N(0, Q) and v~N(0, R). The state and observation equations are constructed to define the process and relate the corresponding measurements, and the noise is set according to process and measurement noise characteristics. The model can be plugged into the Kalman filter to obtain a state estimate for a particular instance.

The Kalman filter estimates a process by using a form of feedback control. First, the process state is estimated using previous state variables and the defined linear system equations, then a feedback is obtained from the measurements. The Kalman filter can thus be thought of as two stages, a prediction stage comprising time update equations and a correction stage comprising measurement update equations. The time update equations project the current state and error covariance estimates to obtain the a priori state estimates. The measurement update equations provide the feedback by incorporating a new measurement into the a priori estimate to obtain a more robust a posteriori estimate. The prediction stage can be defined as:

$$\hat{x}_{n+1}^- = F \times \hat{x}_n,$$

where $\hat{x}_{n+1}^-$ is the a priori state estimate for frame n+1 and $\hat{x}_n$ is the a posteriori state estimate for frame n. The estimate error covariance can be defined as:

$$P_n = E[(x_n - \hat{x}_n)(x_n - \hat{x}_n)^T].$$

At the prediction stage, the a priori estimate covariance for frame n+1 can be defined as:

$$P_{n+1}^- = F P_n F^T Q,$$

where $P_n$ is the a posteriori estimate error covariance for frame n.

In the correction stage, the gain matrix is computed and the a posteriori state estimate can be obtained. The gain matrix is defined as:

$$K_n = P_n^- H^T (H P_n^- H^T + R)^{-1}.$$

The a posteriori state estimate is defined as:

$$\hat{x}_n = \hat{x}_{n+1}^- + K_n(y_n - H \hat{x}_n^-),$$

and the a posteriori estimate error covariance can be calculated from:

$$P_n = (I - K_n H) P_n^-.$$

After each time and measurement update pair, the process is repeated with the previous a posteriori estimates used to predict the new a priori estimates. The Kalman filter therefore recursively conditions the current estimate on all of the past measurements. In one embodiment, a Kalman filter is used to provide a modified motion from the raw global or camera motion determined during motion estimation. In other embodiments, where the process to be estimated or the measurements with respect to the process is nonlinear, an extended Kalman filter, which linearizes the current mean and covariance, can be used.

Figure 3B:
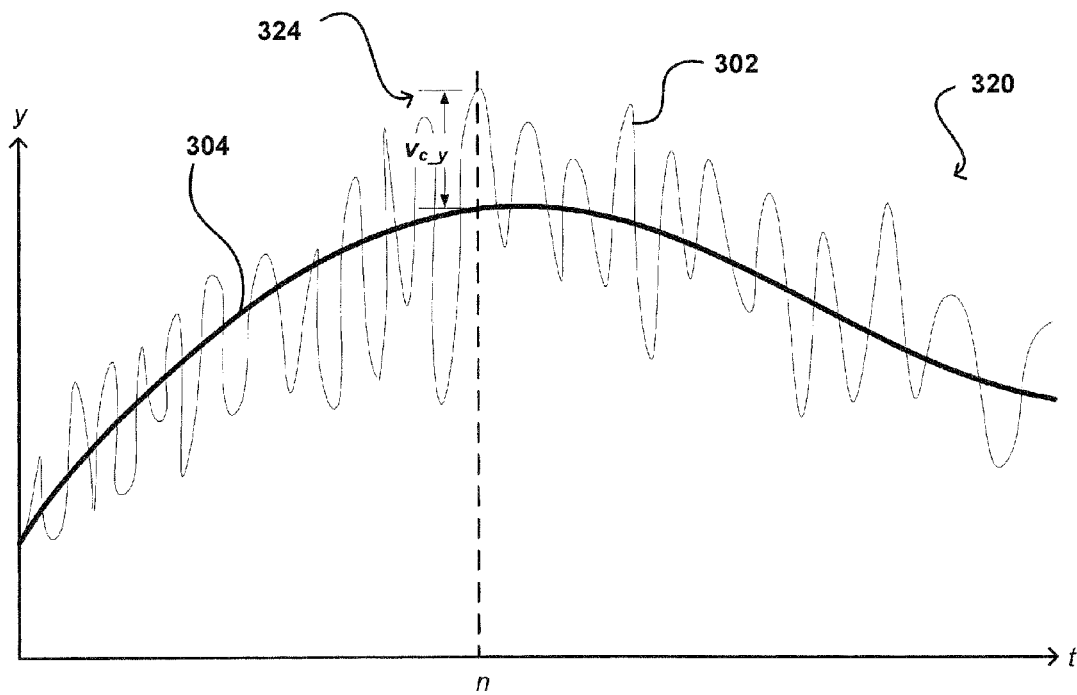

FIG. 3B illustrates an expanded view of a segment 320 of the raw motion 302 and modified motion 304. As mentioned, the modified motion 304 is obtained by filtering and/or smoothing the raw global or camera motion 302 using one of the filtering approaches discussed herein, motion vector integration, frame position smoothing, or Kalman filtering. In this example, a vertical component of the correction vector $v_c$ for frame n, i.e., $v_{c\_y}$, is obtained by determining the displacement 324 between the raw motion 302 and modified motion 304. Although not shown here, a similar approach can be used to determine the horizontal component of the correction vector $v_c$. That is, the horizontal component of the raw or global motion can be determined using a motion estimation technique (e.g., block matching, differentiation, or phrase correlation). Unintentional camera motion can be filtered or smoothed using an approach such as motion vector integration, frame position smoothing, or Kalman filtering. The horizontal component of the correction vector $v_c$, $v_{c\_x}$, can be determined by calculating the displacement between the raw global motion and the modified motion.

Figure 4A:
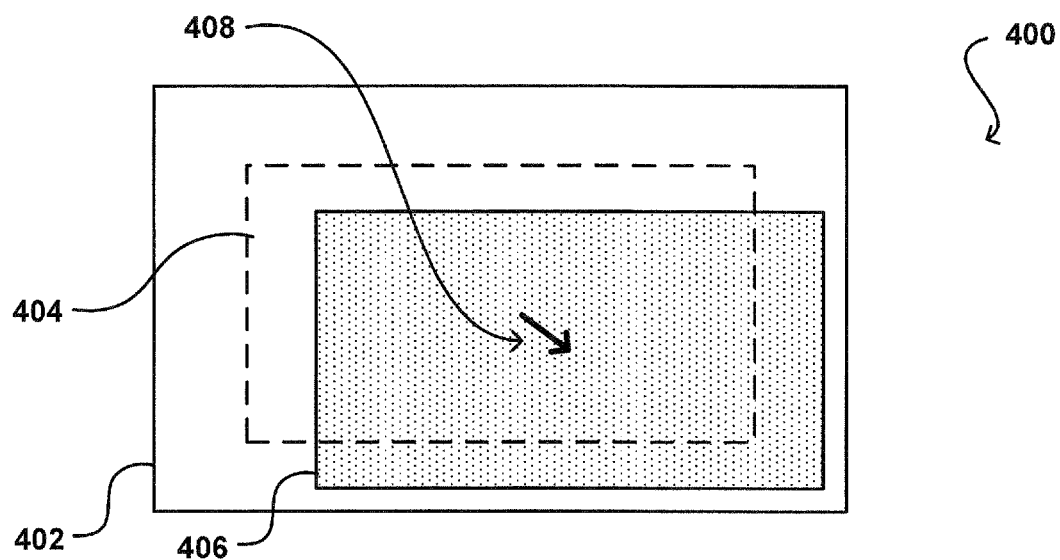
FIGS. 4A and 4B illustrates an example process for creating a modified video in accordance with an embodiment.

After the correction vector $v_c$ for a frame of an input video has been determined, the output frame can be selected according to the correction vector. FIG. 4A illustrates an example approach 400 for selecting an output frame for a stabilized video from an input video including jitter or camera-shake. Depicted in this example are a raw input frame 402, an uncorrected output frame 404, and a corrected output frame 406. As mentioned, input video can be captured at a resolution greater than the desired resolution for the output video in various embodiments. In other embodiments, the input video can be captured at a standard format (e.g., 1280×720, 1920×1080) and can be upsampled. Hence, the raw input frame 402 may contain more pixels than a corresponding output frame as illustrated in FIG. 4A. In certain situations, it may be determined that a frame does not need to be compensated or corrected for jitter and the like, and an output frame can be selected from a central region of the raw input frame 402, such as the uncorrected output frame 404. In this situation, however, it has been determined that a correction vector 408 needs to be applied to correct or compensate for jitter or camera-shake. The corrected output frame 406 can then be selected from the set of pixels shifted from the center of the raw input frame according to the dimensions of the correction vector 408.

Figure 4B:
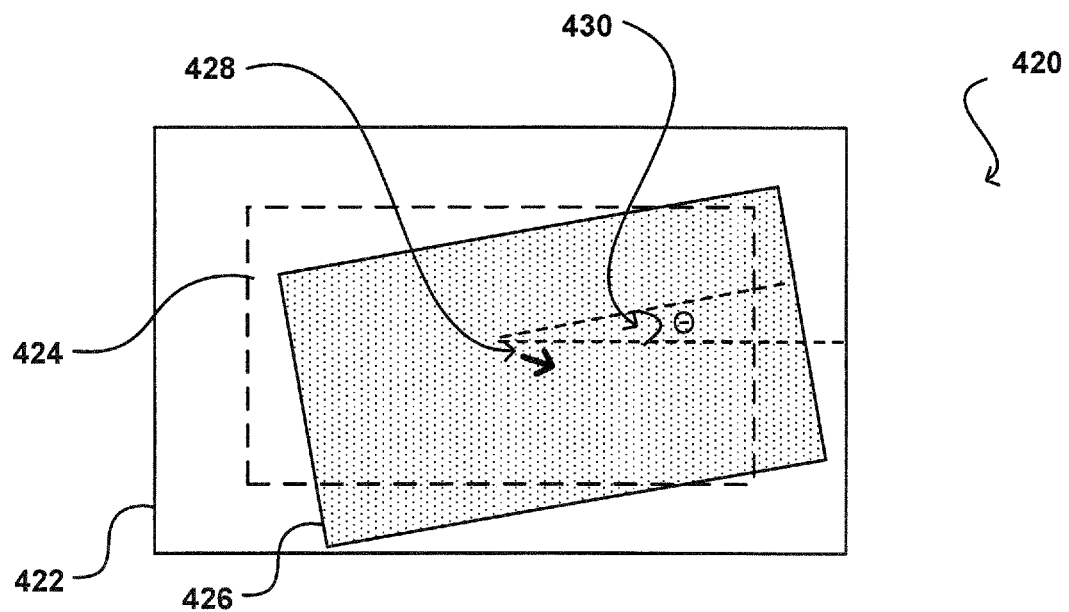

Although FIG. 4A illustrates an example of correcting for translational motion, it will be appreciated that other embodiments may also use similarity, affine, or other geometric models to account for scale, rotation, affine distortions, and other inter-frame changes. For example, FIG. 4B illustrates another example approach 420 for selecting an output frame for a stabilized video from an input video including jitter or camera-shake. In this example, a raw input frame 422, an uncorrected output frame 424, and a corrected output frame 426 are shown. The correction vector 428 defines a translation to be applied when selecting the output frame to compensate for jitter or camera-shake. In addition, the jitter includes a rotational component requiring a corrective rotation Θ 430, which is applied in selecting the pixels for corrected output frame 426.

In some embodiments, various image enhancement techniques may also be applied to one or more frames of the output video, including deblurring, denoising, specular reflection removal, histogram optimization, brightness and contrast optimization, and color-cast correction. Approaches for deblurring a video include inverse filtering, Wiener filtering, or the Richardson-Lucy method. Inverse filtering is based on the premise that convolutions in the spatial domain become pixel-by-pixel multiplications in the frequency domain:

$$g = h \otimes f \Longleftrightarrow G = H \cdot F,$$

where G and F are Fourier transforms of the frames (or zones) g and f, respectively, and H is the Fourier transform of the PSF or convolution kernel. Knowing the PSF or convolution kernel h and the blurred frame (or zone) g, g can be deblurred to obtain frame (or zone) f by:

$$f = \mathcal{F}^{-1}\left(\frac{\mathcal{F}(g)}{\mathcal{F}(h)}\right),$$

where $\mathcal{F}$ is the discrete Fourier transform, $\mathcal{F}^{-1}$ is the inverse discrete Fourier transform, and $$\frac{\mathcal{F}(g)}{\mathcal{F}(h)}$$

represents the pixel-by-pixel division. Inverse filtering, however, may only work under certain conditions. For example, the equivalence (**) may only be valid if the edge handling is circulator, which is not often the case. As a result, strong deconvolution artifacts may appear at the edges of the deblurred image. Further, inverse filtering is less effective when there is additive noise.

Wiener filtering attempts to address the noise problems inherent in deconvolution. It works in the frequency domain, and tries to minimize the impact of deconvoluted noise at frequencies which have poor signal-to-noise ratio. A simplified version of the Wiener filter is defined as:

$$\tilde{f} = \mathcal{F}^{-1}\left(\frac{H^2}{H^2 + k} \cdot \frac{H \cdot F + N}{\mathcal{F}(h)H}\right),$$

where k is non-negative constant added to every pixel of the squared transformed convolution kernel. The greater the value of k, the more noise is suppressed. However, a greater value of k may also result in poor deblurring.

The Richardson-Lucy (R-L) technique is an iterative method that computes a sequence of images which converge to the desired, deblurred image. R-L begins by estimating a first approximation of the deblurred frame (or zone). The approximation is refined at each iteration using a correction factor based on the ratio between the blurred image and the approximation. R-L is defined as:
(First Approximation)

$$\forall y, x : \tilde{f}_0(y,x) := c, c \in R_+ \setminus \{0\}$$

(R-L Iteration)

$$\tilde{f}_{n+1} = \tilde{f}_n \cdot \left(h \otimes \frac{g}{h \otimes \tilde{f}_n}\right), n > 0$$

In some embodiments, denoising techniques may also be applied on a frame-by-frame basis to generate an image-optimized video. For example, image sensors can be subject to a variety of noise, including dark-current shot noise, photon shot noise, fixed pattern noise, bias noise, quantization noise, etc. These effects can differ from sensor to sensor as well as from pixel to pixel in the same sensor. In accordance with various embodiments, an electronic device can be calibrated to measure the data associated with each of these conditions. For instance, bias is an offset can occur when a pixel is read from an image sensor of an electronic device. A camera can be calibrated to eliminate (or at least substantially reduce) bias noise by subtracting "a bias noise compensation image" from an image captured at a particular exposure setting. A bias noise compensation image can be generated for each exposure setting of a camera by taking the average or the median of a series of zero-length exposures (or as close as possible to zero length) with the shutter closed for the corresponding exposure setting.

Dark noise can be the result of the gradual accumulation of dark current in the pixels of a sensor during an exposure. The accumulation of dark current is related to the temperature of the image sensor. For example, an increase in temperature of six to ten degrees Celsius can double the amount of dark noise for certain image sensors. Dark current can accumulate at a different rate in every pixel of a sensor, and a camera can be calibrated to compensate for dark noise in various ways. One approach is to generate a "dark noise compensation image" corresponding to the same exposure time and temperature as a captured image, with the shutter closed. Alternatively, a "master dark noise compensation image," comprising the average or median of several dark noise compensation images, such as 10 to 20 dark noise compensation images, under the same exposure time and temperature as the captured image can be used in this approach. Another technique for dark noise calibration is to generate "scaled dark noise compensation images" prior to image capturing. Scaled dark noise compensation images comprise master dark noise compensation images obtained at a set of specified temperatures for a set of exposure settings. Master dark noise compensation images, using this technique, can be created by subtracting a bias noise compensation image from each dark noise compensation image and taking the average or median of the dark noise compensation images. Bias noise compensation images can be applied to the captured image data, and the master dark noise compensation image corresponding to a specified temperature and exposure setting can be applied to scale the master dark noise compensation image to the time of the captured image. Other approaches for calibrating an electronic device for image (and video) capture are discussed in co-pending U.S. patent application Ser. No. 13/829,147, filed Mar. 14, 2013, entitled "Approaches for Creating High Quality Images," which is hereby incorporated by reference herein.

Specular reflection can affect the quality of images (or videos) captured by an electronic device. For example, if an object being imaged is at least somewhat glossy, that object can reflect a significant portion of that light along one or more angles, depending upon factors such as the shape of the object and the relative position of each nearby light source. If the direction in which light from a light source is reflected happens to coincide with at least a portion of a camera sensor, at least a portion of the sensor might be saturated by the light such that any information about the object at that location is lost. Even in situations where the sensor is not saturated, the amount of light reflected can dominate that portion of the sensor such that it is difficult to extract any useful information about the object. Thus, in at least some embodiments, the computing device can detect a specular reflection, amount of saturation, or other measure of excessive intensity incident of at least a portion of a camera or sensor of an electronic device, and remove such image distortions. Approaches for removing specular reflection and the like are discussed in co-pending U.S. patent application Ser. No. 13/829,147, filed Sep. 24, 2012, entitled "Reducing Specular Reflection Effects for Image Processing," which is hereby incorporated by reference herein.

Other image enhancement techniques that can be performed on one or more frames of the output video may include histogram optimization, brightness and contrast optimization, and/or color-cast correction. Images can be represented according to an eight-bit dynamic range, i.e., there are $2^8=256$ possible brightness values, with zero being black and 255 being white. Color images can have three arrays of numbers typically representing red, green, and blue (RGB) images that are combined to give the full spectrum of colors. Many image enhancement techniques involve the use of the histogram of an image, which can be created by counting the number of times each brightness value (or RGB value) occurs in the image, then dividing by the total number of pixels in the image to create a distribution of the percentage of each brightness value (or RGB value) in the image. The histogram thus can describe the statistical distribution in brightness values (or RGB values) in the image. An image can be enhanced in various ways by remapping the original brightness values (or RGB values) to different brightness values (or RGB values).

Contrast enhancements can improve the perceptibility of objects in a scene by enhancing the brightness difference between objects and their backgrounds. Image sensors are generally designed to record a wide range of brightness values but few scenes utilize the full sensitivity range of these sensors. To produce an image with an optimum contrast ratio, approaches such as linear contrast stretch, nonlinear contrast stretch, or Gaussian stretch can be performed on one or more output frames. A linear contrast stretch typically operates by remapping the low end of the original histogram to black and the high end to white and the remaining pixel values in between are distributed linearly between these extremes. The linear contrast stretch can improve the contrast of most of the original brightness values, but there may be a loss of contrast at the extreme high and low end of the image. The nonlinear contrast enhancement typically operates by redistributing a histogram by to apply the greatest contrast enhancement to the most populated range of brightness values in the original image, which can result in maximum contrast. A Gaussian stretch is a nonlinear stretch that enhances contrast within the tails of the histogram. This can improve contrast in the light and dark ranges of the image, and occurs at the expense of contrast in the middle gray range.

Color of an image can be represented in various ways, including the aforementioned RGB system or the intensity, hue, and saturation (IHS) system. The IHS system is based on the color sphere in which the vertical axis represents intensity, the radius corresponds to saturation, and the circumference corresponds to hue. The intensity (I) axis represents brightness variations and can range from black (0) to white (255). The hue (H) axis represents the color wavelength and ranges from 0 at the midpoint of red tones and increases counter-clockwise around the circumference of the sphere to conclude with 255. The saturation (S) axis represents the purity of color and ranges from impure (0) at the center of the color sphere to pure (255) at the circumference. A typical color enhancement comprises converting the color of an image from the RGB system into the IHS system and performing a linear contrast stretch on the saturation axis.

Figure 5:
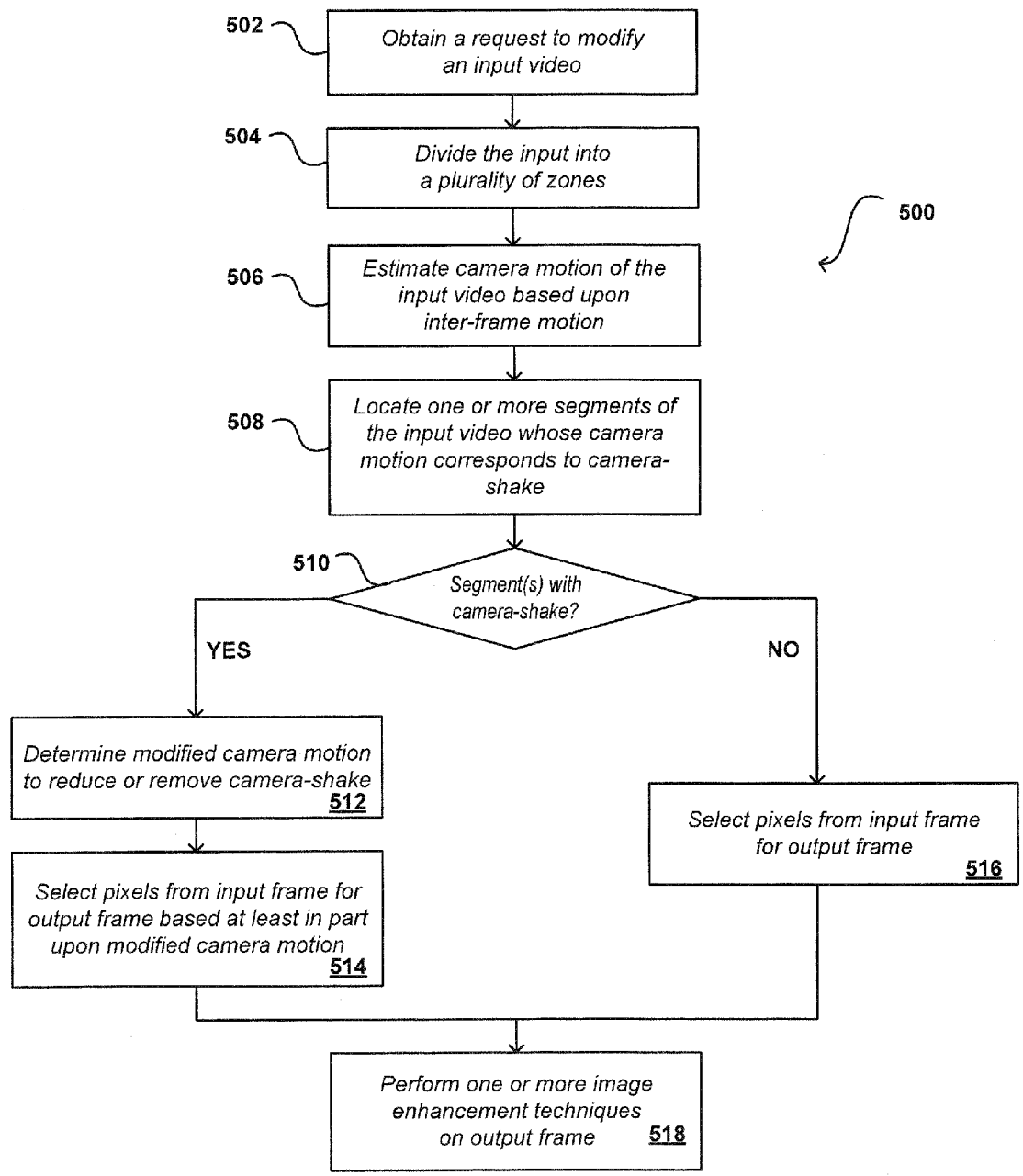
FIG. 5 illustrates an example process for enhancing a video in accordance with various embodiments.

FIG. 5 illustrates an example process 500 for creating and editing high-quality video. It should be understood, however, that there can be additional, fewer, or alternative steps performed in similar or alternative orders, or in parallel, within the scope of the various embodiments unless otherwise stated. In this example, the process begins by obtaining a request for modifying an input video 502. In some embodiments, the request may be received directly from an electronic device, such as a tablet, smartphone, stand-alone digital camera, or camcorder, after video capture and the various steps discussed herein are performed on that device. In other embodiments, the input video may be uploaded to a remote server system, such as a system discussed in FIG. 8, and the request to modify the input video may be received, for example, to a web service of the remote server system. The input video may be partitioned into a plurality of zones 504. As mentioned, the zones may be square or rectangular divisions encompassing each frame of the input video, such as a 16×9 grid, 4×3 grid, quartiles, thirds, etc. In other embodiments, zones may be made of other shapes, such as circles or hexagons, or can have no clearly defined shape, such as "blobs" or regions of the input video. Zones may also be overlapping portions of each of frame of the input video in some embodiments. After the input video has been divided into zones, the global motion or the motion due to movement of the camera can be measured for the input video 506. Global motion is determined frame by frame of the input video using one of the various approaches discussed in the disclosure herein, such as block matching, differential methods, or phrase correlation. In those embodiments in which the input video has been divided into zones, inter-frame motion can be determined for each zone and those zones whose inter-frame motion vectors are determined to be outliers can be discarded. The remaining motion vectors can be averaged or other regression analysis can be performed to determine a gross motion vector for the frame. In at least some embodiments, a confidence level may be associated with a determined inter-frame motion vector. If the motion vector is below a threshold confidence level, one or more additional techniques for analyzing motion can be performed to obtain a more robust determination of the motion vector for a particular frame. For example, motion may be first determined using a block matching in technique in one embodiment and the determined motion vector for multiple zones may be a first set of values and the motion vector for another plurality of zones may be a second set of values. Motion may then be analyzed using a phase correlation technique to determine whether the first set of values or the second set of values more accurately describes the motion for that frame.

After global or camera motion has been estimated for the input video, the motion is analyzed to determine whether it is intended or unintended by the user. For example, smaller magnitude (e.g., 0 to 3 degrees) and higher frequency motion (e.g., 4 to 40 Hz) typically corresponds to shake of a hand-held device and can be classified as unintended camera motion. Motion can also be due to "bounce" as the user is walking with a hand-held device or a head-mounted display unit and various magnitudes and frequencies may be associated with such "bounce" depending on the user's gait. Such unintended motion, below a threshold magnitude and exceeding a threshold frequency or within a range of magnitudes or frequencies corresponding to undesired motion, can be filtered out by locating such motion within the input video 508. When a segment of the input video includes unintended motion 510, a modified camera motion or path can be determined that reduces or removes that motion 512 by re-windowing or selecting the pixels from the input frame according to the modified camera motion 514. When a segment of the input video does not include unintended motion, a standard window of the input frame can be selected for the output frame 516.

In various embodiments, image enhancement techniques can also be performed on each output frame. In some embodiments, edges in one or more output frames can be enhanced using Laplacian filters or other edge enhancement filters to adjust contrast near edges and/or widen edges. In some embodiments, output frames can be deblurred, denoised, filtered for specular reflection, and/or optimized via histogram optimization, brightness and contrast optimization, and color-cast correction. Various other image enhancement techniques can also be performed as is known in the art and as suggested by the disclosure and teachings provided herein.

In some embodiments, the systems and approaches discussed herein can be used to correct for the errors and other undesired characteristics of video captured by a device operating with optical image stabilization (OIS) and/or electronic image stabilization (EIS). In this way, the techniques disclosed herein can be supplemental to such conventional approaches. For example, the threshold magnitude and frequency of unintended motion can be adjusted to account for video captured by OIS- and/or EIS-enabled devices. In other embodiments, OIS and/or EIS can be disabled during video capture so that more of the raw input video can be acquired, and there may be less motion blur and other noise due to OIS and/or EIS.

Figure 6:
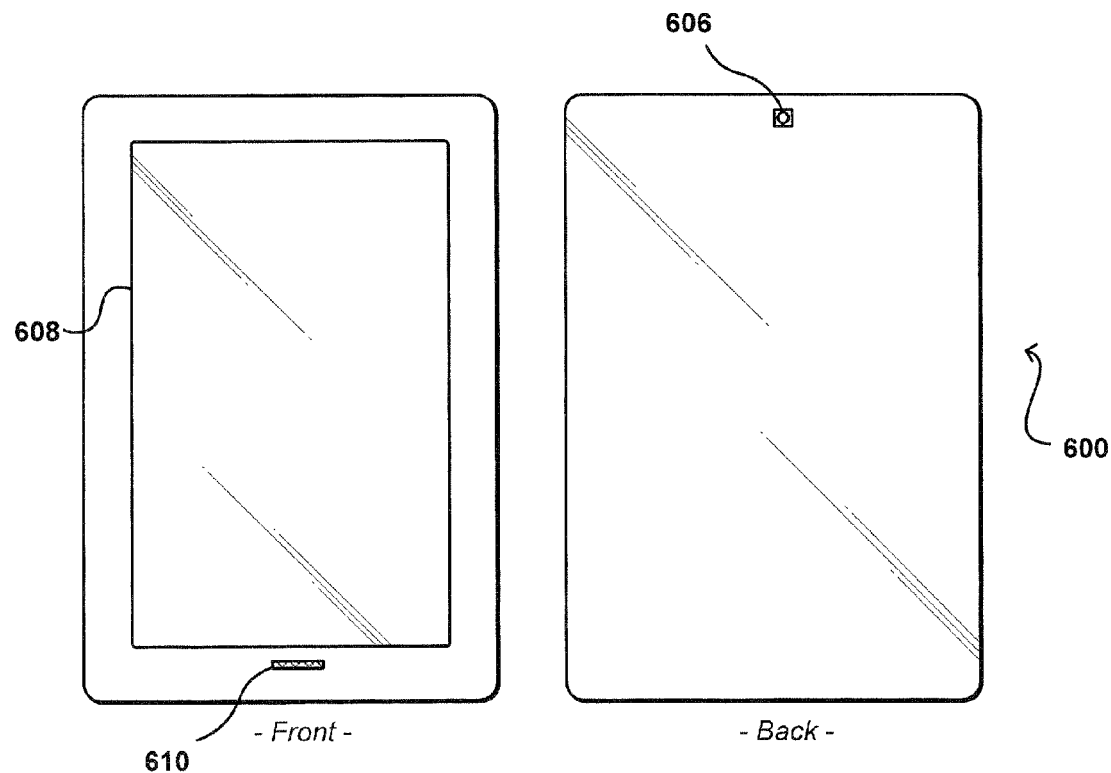
FIG. 6 illustrates an example of a computing device that can be used in accordance with various embodiments.
Figure 7:
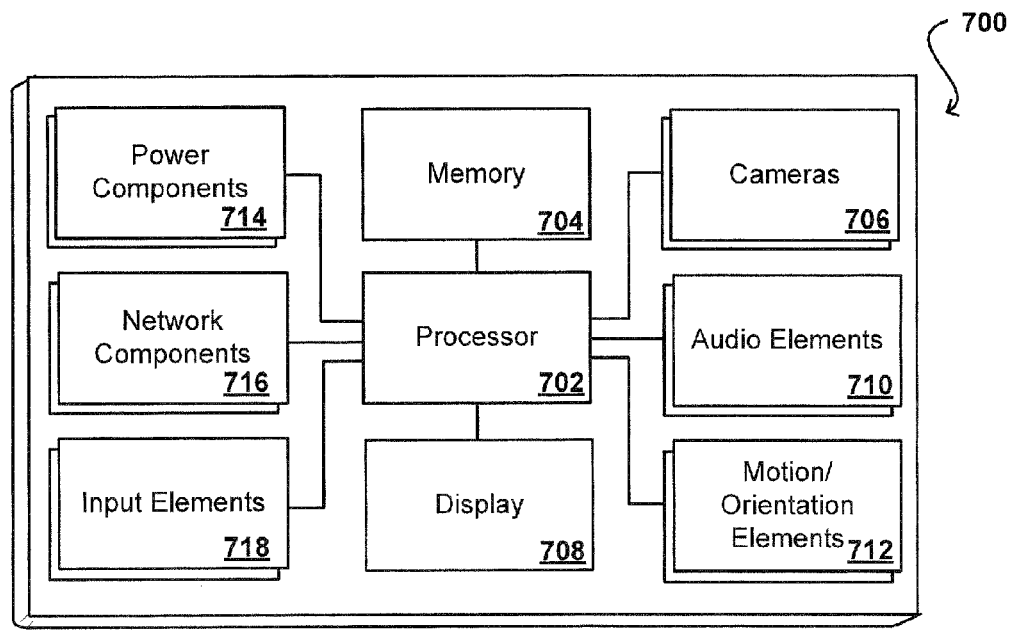
FIG. 7 illustrates an example configuration of components of a computing device such as that illustrated in FIG. 6.

FIG. 6 illustrates an example computing device 600 that can be used to perform approaches described in accordance with various embodiments. In this example, the device includes at least one camera 606 located on a back surface of the device, on an opposite side of a display element 608, and enabling the device to capture images and videos in accordance with various embodiments. The computing device also includes a microphone 610 for capturing audio. FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 708, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As mentioned, the device in many embodiments will include one or more cameras or image sensors 706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 714 known in the art for providing power to a computing device, which can include capacitive charging elements for use with a power pad or similar device. The computing device can include one or more communication elements or networking sub-systems 716, such as a Wi-Fi, Bluetooth®, RF, wired, or wireless communication system. The device in many embodiments can communicate with a network, such as the Internet, and may be able to communicate with other such devices. In some embodiments the device can include at least one additional input device 718 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include one or more orientation and/or motion sensors 712. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

In some embodiments, the device 700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
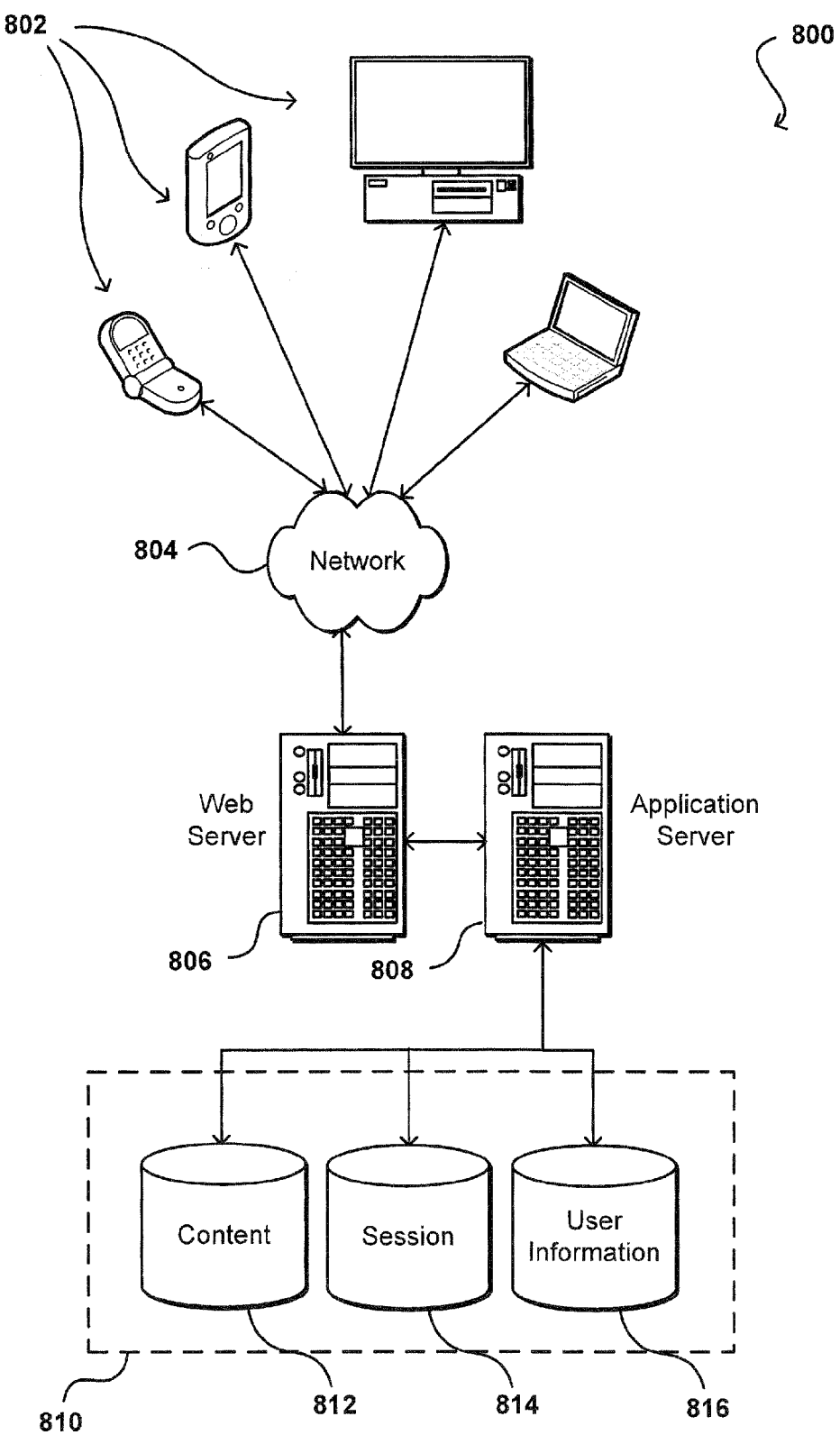
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   one or more processors;
   memory including instructions that, when executed by the one or more processors, cause the computing system to:
   obtain a request to modify an input video, the input video corresponding to a first resolution;
   divide the input video into a plurality of zones;
   estimate camera motion of the input video based at least in part upon a plurality of inter-frame motion vectors of the plurality of zones of each frame of the input video;
   determine that the camera motion of at least one input segment of the input video is unintentional based at least in part upon a magnitude of the camera motion of the at least one input segment being below a threshold magnitude and a frequency of the camera motion of the at least one input segment exceeding a threshold frequency;
   determine a modified motion for the at least one input segment that at least reduces the frequency of the camera motion of the at least one input segment; and
   generate an output video based at least in part upon selection of at least a portion of pixels of each input frame of the input video, at least one output segment of the output video selected based at least in part upon the modified motion, the output video corresponding to a second resolution that is lower than the first resolution.

2. The computing system of claim 1, wherein the instructions when executed further cause the computing system to:
   perform one or more image enhancements for at least one output frame of the output video, the one or more image enhancements including at least one of deblurring, denoising, histogram optimization, brightness optimization, color-cast correction, specular reflection reduction, or edge enhancement.

3. The computing device of claim 1, wherein the instructions when executed further cause the computing system to:
   determine that the camera motion of at least one second input segment of the input video is intentional based at least in part upon a second magnitude of the camera motion of the at least one second input segment and a second frequency of the camera motion of the at least one second input segment; and
   determine a second modified motion for the at least one second input segment that smoothens the camera motion of the at least one second input segment,
   wherein at least one second output segment of the output video is selected based at least in part upon the second modified motion.

4. A computer-implemented method for modifying video, comprising:
   under control of one or more computing systems configured with executable instructions,
      dividing a plurality of frames of an input video into at least a first zone and a second zone;
      determining a first set of inter-frame motion vectors corresponding to the first zone;
      determining a second set of inter-frame motion vectors corresponding to the second zone;
      discarding at least one inter-frame motion vector, from the first set of inter-frame motion vectors, determined to be an outlier to generate an updated set of inter-frame motion vectors;
      determining camera motion corresponding to a period of time the input video is captured based at least in part upon the updated set of inter-frame motion vectors and the second set of inter-frame motion vectors;
      determining that a frequency of the camera motion of at least one input segment of the input video exceeds a threshold frequency;
      determining a modified motion for the at least one input segment that at least reduces the frequency of the camera motion of the at least one input segment; and
      generating an output video based at least in part upon selection of at least a portion of pixels of one or more frames of the at least one input segment, at least one output segment of the output video selected based at least in part upon the modified motion.

5. The computer-implemented method of claim 4, wherein the input video corresponds to a first resolution and the output video corresponds to a second resolution that is lower than the first resolution.

6. The computer-implemented method of claim 4, further comprising:
   upsampling one or more input frames of the at least one input segment such that a resolution of one or more output frames of the at least one output segment corresponds to an original resolution of the input video.

7. The computer-implemented method of claim 4, further comprising:

determining that a magnitude of the camera motion of the at least one input segment is below a threshold magnitude.

8. The computer-implemented method of claim 4, further comprising:
performing one or more image enhancements for at least one output frame of the output video, the one or more image enhancements including at least one of deblurring, denoising, histogram optimization, brightness optimization, color-cast correction, specular reflection reduction, or edge enhancement.

9. The computer-implemented method of claim 4, further comprising:
determining that a magnitude of the camera motion of at least one second input segment of the input video is within a threshold magnitude; and
determining a second modified motion for the at least one second input segment that smoothens the camera motion of the at least one second input segment,
wherein at least one second output segment of the output video is selected based at least in part upon the second modified motion.

10. The computer-implemented method of claim 4, wherein determining the camera motion of the input video is based at least in part upon one of block matching, differentiation, or phase correlation.

11. The computer-implemented method of claim 4, wherein determining the modified motion of the at least one input segment is based at least in part upon at least one of motion vector integration, frame position smoothing, or Kalman filtering.

12. A computing device, comprising:
one or more cameras;
a display element;
one or more processors; and
memory including instructions that, when executed by the one or more processors, cause the computing device to:
capture an input video using the one or more cameras;
determine camera motion used to capture the input video based at least in part upon a plurality of inter-frame motion vectors of each frame of the input video;
determine that the camera motion of at least one input segment of the input video is unintentional based at least in part upon a frequency of the camera motion of the at least one input segment exceeding a threshold frequency;
determine a modified motion for the at least one input segment that at least reduces the frequency of the camera motion of the at least one input segment;
generate an output video based at least in part upon selection of at least a portion of pixels of each input frame of the input video, at least one output segment of the output video selected based at least in part upon the modified motion; and
display the output video on the display element.

13. The computing device of claim 12, wherein the instructions when executed further cause the computing device to:
divide the input video into a plurality of zones;
determine a respective set of inter-frame motion vectors for the plurality of zones of a plurality of frames of the input video; and
discard at least one inter-frame motion vector of at least one of the plurality of zones determined to be an outlier.

14. The computing device of claim 12, wherein the instructions when executed further cause the computing device to:
perform one or more image enhancements for at least one output frame of the output video, the one or more image enhancements including at least one of deblurring, denoising, histogram optimization, brightness optimization, color-cast correction, specular reflection reduction, or edge enhancement.

15. The computing device of claim 12, wherein the instructions when executed further cause the computing device to:
determine that a magnitude of the camera motion of at least one second input segment of the input video is within a threshold magnitude; and
determine a second modified motion for the at least one second input segment that smoothens the camera motion of the at least one second input segment,
wherein at least one second output segment of the output video is selected based at least in part upon the second modified motion.

16. The computing device of claim 12, wherein the modified motion is based at least in part on at least one of motion vector integration, frame position smoothing, or Kalman filtering.

17. A non-transitory computer-readable storage medium storing instructions for modifying video, the instructions when executed by one or more processors causing the one or more processors to:
divide a plurality of frames of an input video into at least a first zone and a second zone;
determine a first set of inter-frame motion vectors corresponding to the first zone;
determine a second set of inter-frame motion vectors corresponding to the second zone;
discard at least one inter-frame motion vector, from the first set of inter-frame motion vectors, determined to be an outlier to generate an updated set of inter-frame motion vectors;
determine camera motion corresponding to a period of time the input video is captured based at least in part upon the updated set of inter-frame motion vectors and the second set of inter-frame motion vectors;
determine that a frequency of the camera motion of at least one input segment exceeds a threshold frequency;
determine a modified motion for the at least one input segment that at least reduces the frequency of the camera motion of the at least one input segment; and
generate an output video based at least in part upon selection of at least a portion of pixels of one or more frames of the at least one input segment, at least one output segment of the output video selected based at least in part upon the modified motion.

18. The non-transitory computer-readable storage medium of claim 17, wherein the camera motion is determined based at least in part upon one of block matching, differentiation, or phase correlation.

19. The non-transitory computer-readable storage medium of claim 17, wherein a confidence level is associated with an inter-frame motion vector of at least one frame of the input video, and the instructions when executed further cause the one or more processors to:
perform a second motion estimation algorithm for the at least one frame when the confidence level of the at least one frame is below a threshold confidence level.

20. The non-transitory computer-readable storage medium of claim 17, wherein the instructions when executed further cause the one or more processors to:
upsample one or more input frames of the at least one input segment such that a resolution of one or more output frames of the at least one output segment corresponds to an original resolution of the input video.

* * * * *